United States Patent [19]
Vaughn et al.

[11] Patent Number: 5,145,308
[45] Date of Patent: Sep. 8, 1992

[54] MOTORCYCLE TOWING DEVICE

[76] Inventors: E. Lanny Vaughn, 4334 Heights Ave.; Richard J. Nannini, 26 Zion Ave., both of Pittsburg, Calif. 94565

[21] Appl. No.: 649,554

[22] Filed: Feb. 1, 1991

Related U.S. Application Data

[63] Continuation-in-part of Ser. No. 471,606, Jan. 29, 1990, abandoned.

[51] Int. Cl.⁵ .............................. B60D 7/00
[52] U.S. Cl. .................. 414/462; 280/402; 414/537; 414/563
[58] Field of Search ............. 280/402; 414/537, 563, 414/462, 463, 466

[56] References Cited

U.S. PATENT DOCUMENTS 3,843,001 10/1974 Willis .................... 414/462

Primary Examiner—Mitchell J. Hill

[57] ABSTRACT

A motorcycle towing apparatus is provided for use with a towing vehicle having a support bar which slidably engages a hitch receiver carried by the towing vehicle and having a ramp pivotally connected to the rear end of the support bar wherein the ramp is movable from a first position in which the ramp extends downwardly to the ground to a second position in which the ramp is elevated off the ground to provide clearance for towing, and also having a wheel cradle carried by the support bar to support the front wheel of the motorcycle. A single person can load and unload a motorcycle from the device.

3 Claims, 4 Drawing Sheets

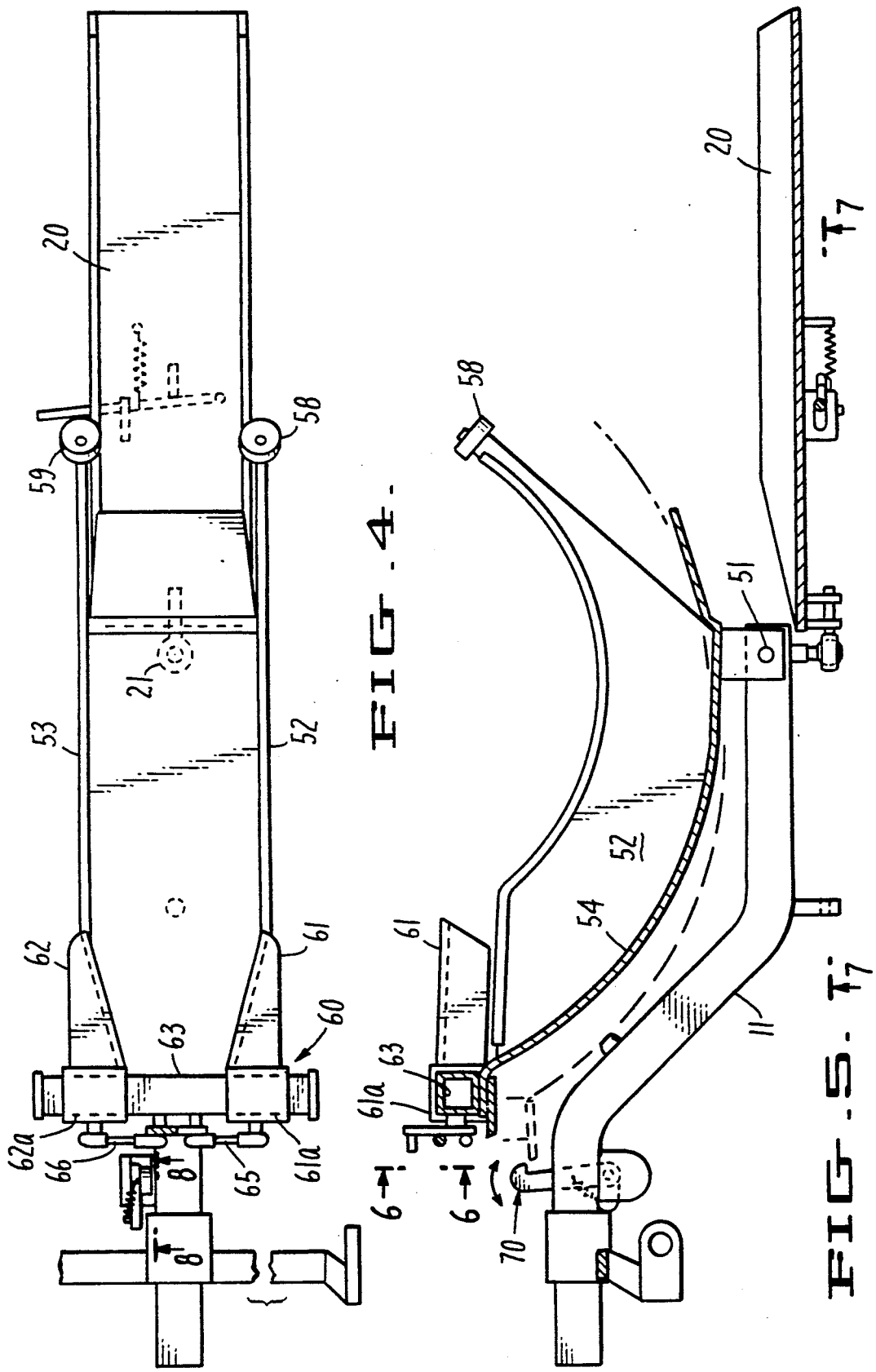

MOTORCYCLE TOWING DEVICE

CROSS REFERENCE TO RELATED APPLICATION

This application is a continuation-in-part of U.S. application Ser. No. 07/471,606, filed Jan. 29, 1990.

BRIEF SUMMARY OF THE INVENTION

This invention relates to a motorcycle towing device.

Relatively complex motorcycle towing devices are known, including the devices shown in the Ortman et al U.S. Pat. 3,764,163 and Kallenbach U.S. Pat. No. 3,778,087.

The present invention relates to a relatively simple and compact device which is designed to attach to a conventional hitch receiver carried by a towing vehicle The prior art includes bumper mounted motorcycle towing devices including the Bane U.S. Pat. No. 3,776,572 and Hancock U.S. Pat. No. 4,111,449. The prior art also includes the Coil U.S. Pat. No. 3,740,074 which teaches a device which is attached to a hitch receiver, but the Coil device is a very complicated structure which requires a relatively great effort to load and unload the motorcycle from the towing apparatus.

The present invention is intended to provide a relatively simple motorcycle towing apparatus which allows a single person to easily load and unload the motorcycle, utilizing the engine of the motorcycle to help load the motorcycle as well as unload the motorcycle from the towing apparatus. The Bane apparatus, shown in U.S. Pat. No. 3,776,572, requires the user to actuate a lever to raise and lower the front wheel of the motorcycle off the ground.

A primary object of the invention is to provide a motorcycle towing apparatus which allows a single user to readily load and unload a motorcycle from the apparatus using the motorcycle's engine to assist in both the loading and unloading processes.

Another object of the invention is to provide a relatively simple motorcycle towing device which is readily attached to a conventional hitch receiver carried by a towing vehicle.

Another object of the invention is to provide a motorcycle towing apparatus in which the vertical height of the towing apparatus may be readily adjusted.

Another object is to provide a motorcycle towing apparatus capable of towing two motorcycles simultaneously.

Other objects and advantages of the invention will become apparent from the following detailed description and the drawings wherein:

BRIEF DESCRIPTION OF THE DRAWINGS

FIG. 4 is a plan view of the apparatus;

FIG. 5 is a side elevation of the apparatus;

DETAILED DESCRIPTION OF THE DRAWINGS

Figure 1:
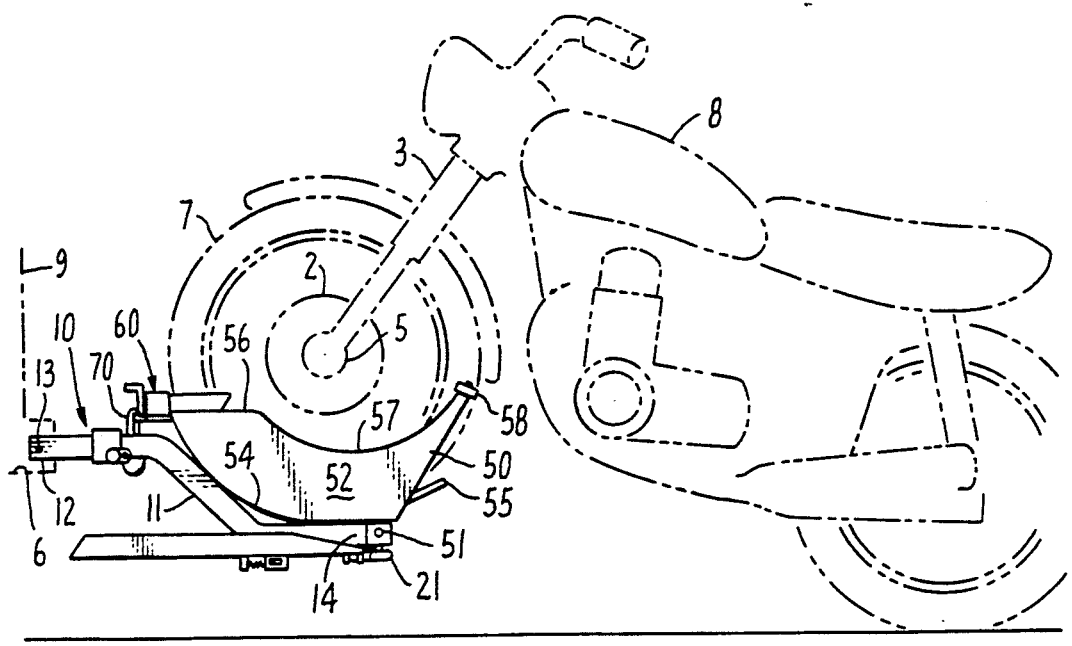
FIG. 1 is a side elevation of the invention showing a motorcycle in its loaded position.
Figure 2:
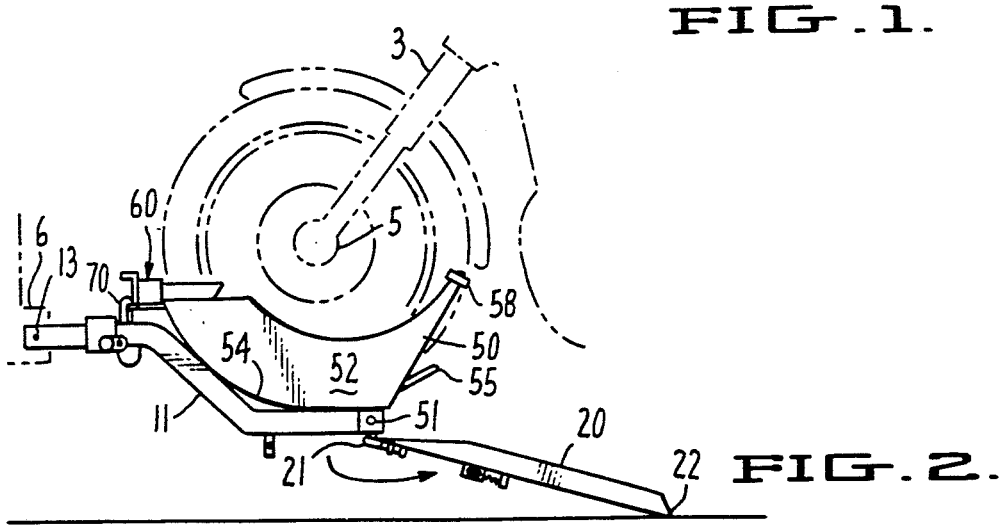
FIG. 2 is a side elevation of the invention showing the motorcycle at the beginning of the unloading process.
Figure 3:
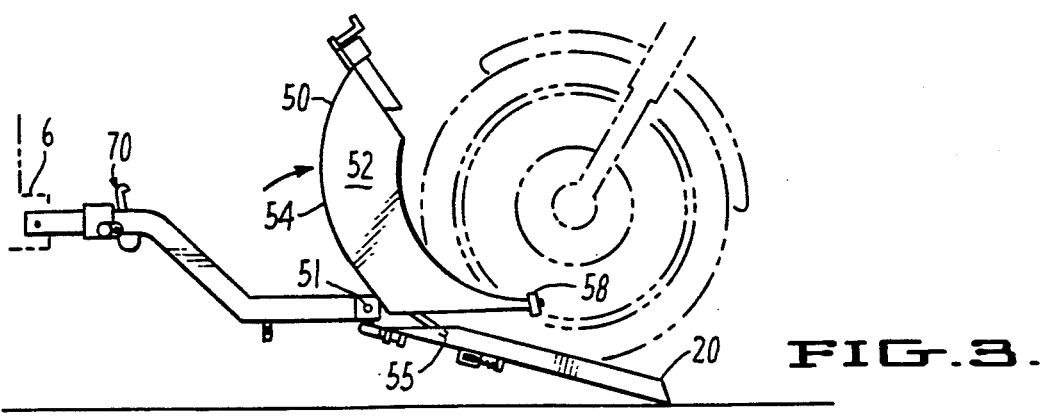
FIG. 3 is a side elevation of the invention showing the position of the apparatus as the motorcycle front wheel approaches the ground.

Referring to FIGS. 1-3, the motorcycle towing apparatus referred to generally as 10 is used with a towing vehicle 9 (shown in phantom) for towing a motorcycle 8 shown in phantom. A support bar 11 has a rectangular cross section. The forward end 12 of support bar 11 is designed to slidably engage and rigidly connect to a hitch receiver carried by the towing vehicle. A hole 13 is provided in the forward portion 12 of support bar 11, through which a pin is extended to secure the support bar 11 to the hitch receiver 6 carried by the towing vehicle 9.

A ramp 20 is pivotally connected by pivot 21 to the rear end 14 of support bar 11. As shown best in FIGS. 1-3, ramp 20 is movable between a first position shown in FIG. 2 wherein the ramp is inclined downwardly from support bar 11 and in which position the rear portion 22 of ramp 20 contacts the ground. Ramp 20 also has a second position shown in FIG. 1 in which ramp 20 is elevated a sufficient height off the ground to provide clearance during towing.

A wheel cradle 50 is provided which carries the weight of the front wheel 7 of motorcycle 8. Wheel cradle 50 is carried by support bar 11 as shown best in FIG. 1, and wheel cradle 50 is pivotally connected at pivot 51 to the rear of support arm 11. Wheel cradle 50 includes sides 52 and 53, base 54, and an upwardly inclined tongue 55 extending rearwardly from pivot 51. Side 52 has a horizontal front portion 56 and an arcuate rear portion 57 to provide clearance from the front brake assembly 2 of the motorcycle. Disc-shaped pads 58 and 59 are carried at the extreme rear ends of sides 52 and 53 of cradle 50. Pads 58 and 59 serve to stabilize the motorcycle by contacting front wheel 7 as shown in FIG. 1. Side 53 is shaped identically to side 52. As shown in FIGS. 1-3, the wheel cradle 50 extends around a considerable portion of the circumference of the front wheel 7 of the motorcycle. We have found that the cradle is most effective when it extends around at least one-fourth of the circumference of the front wheel 7 of the motorcycle. As shown in FIGS. 2 and 3, tongue 55 rotates around pivot 51 as the motorcycle is moved downwardly from the position shown in FIG. 2 to the position shown in FIG. 3 and as the front wheel 7 of the motorcycle approaches the ground, tongue 55 contacts ramp 20 to allow the front wheel of the motorcycle to roll smoothly onto ramp 20 during the unloading process.

Figure 6:
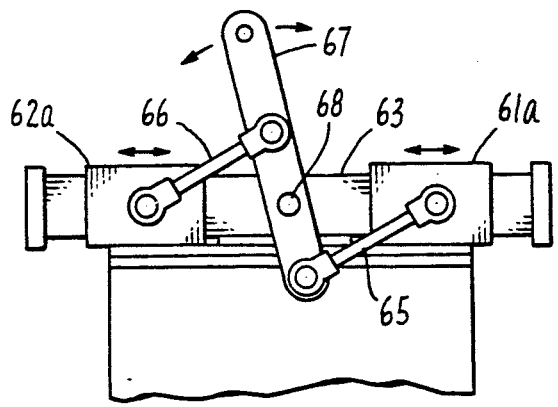
FIG. 6 is a section on the line 6—6 of FIG. 5.
Figure 7:
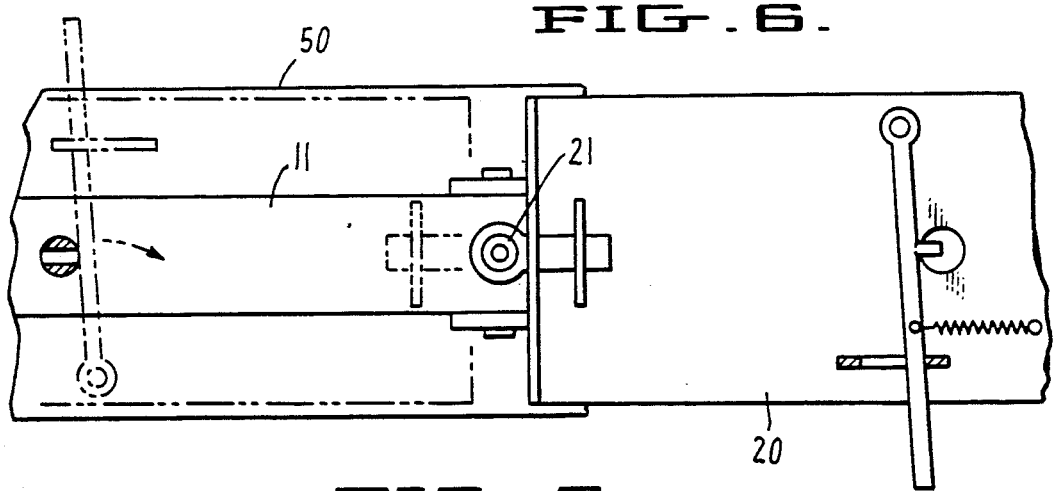
FIG. 7 is a section on the line 7—7 of FIG. 5.

Wheel clamp means 60 is carried by wheel cradle 50 for securing the front wheel 7 of the motorcycle to the cradle. As shown best in FIG. 4, wheel clamp means 60 comprises a pair of tapered arms 61 and 62 mounted on crossbar 63 which is welded to the front of cradle 50. The forward ends 61a and 62a of members 61 and 62 are adjustable (FIG. 6) by links 65 and 66, driven by handle 67 pivotally connected to crossbar 63 at pivot 68. In operation, the opening between arms 61 and 62 is set to provide a firm connection between wheel clamp means 60 and the front wheel 7 of the motorcycle.

Figure 9:
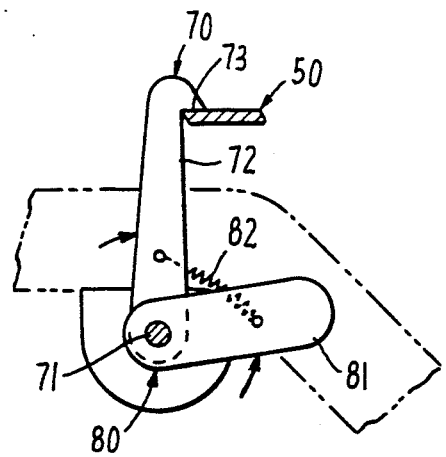
FIG. 9 is a side elevation of the apparatus shown in FIG. 8 in its alternate position.
Figure 8:
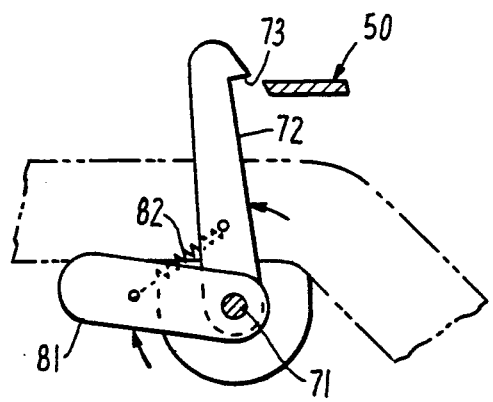
FIG. 8 is a section on the line 8—8 of FIG. 4.

Referring to FIGS. 3, 8 and 9, a releasable catch means 70 is carried by support bar 11 by a pin 71. An arm 72 extends upwardly from pin 71 and at its upper end has a pawl 73 which grips the front portion of cradle 50 and keeps cradle 50 in its towing position shown in FIG. 1. A manually actuated release means 80 is connected to catch means 70 and comprises handle 81 and spring 82 extending from handle 81 to catch arm 72.

In operation, the user inserts the forward end 12 of support bar 11 into the hitch receiver 6 of towing vehicle 9 and secures support bar 11 to hitch receiver 6 by a pin extending through hole 13 in support bar 11. The user then actuates handle 81 to the release position shown in FIG. 8 to allow the cradle 50 to be rotated to the loading position shown in FIG. 3. The user may then start the engine of the motorcycle and drive the motorcycle slowly up ramp 20 to the position shown in FIG. 2 at which point handle 81 is rotated to the position shown in FIG. 9 where catch means 70 engages the front portion of cradle 50 and holds cradle 50 in the position shown in FIG. 1. At this position, the front axle 5 of motorcycle 8 is forward of pivot 51 to provide stability. As the motorcycle 8 is driven into its position shown in FIG. 1, the front tire 7 engages arms 61 and 62 of clamp means 60, stabilizing the front wheel of the motorcycle. The rear end 22 of ramp 20 is moved to its position shown in FIG. 1 to provide ground clearance during towing. As a practical matter stabilizer straps (not shown in the drawings) are attached to the forks 3 of the motorcycle and extend to either side of the towing vehicle 9 to provide vertical stability for motorcycle 8 during towing.

To unload the motorcycle, a single user releases catch means 70 by moving handle 81 to its release position shown in FIG. 8. When catch means 70 is released, the user may use the engine of the motorcycle to back the motorcycle slowly from the position shown in FIG. 1 to the ground as shown in FIG. 3. A single user may therefore load and unload a motorcycle by using the engine of the motorcycle to assist in both processes.

When the user does not intend to be towing a motorcycle, the entire towing apparatus 10 is readily removed from the hitch receiver 6 and can be comfortably carried in the towing vehicle 9 or easily stored.

Figure 10:
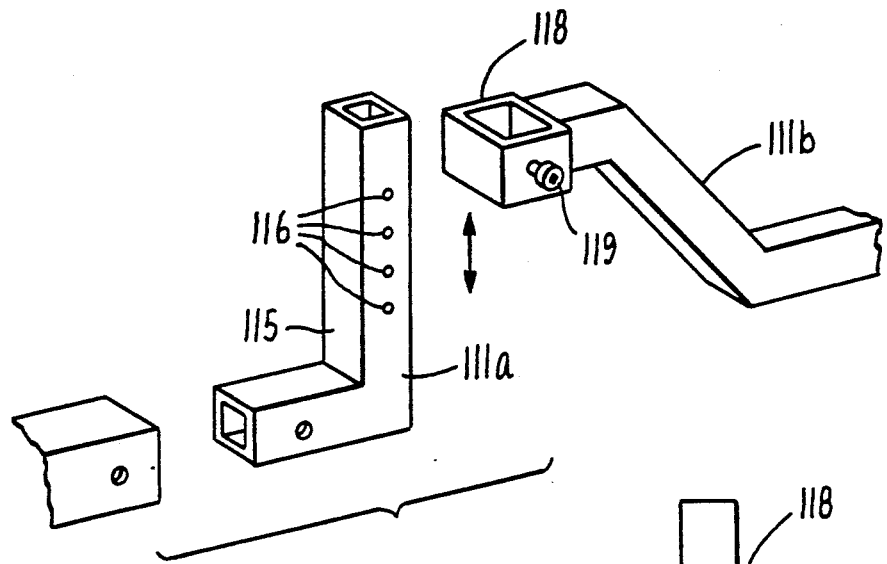
FIG. 10 is a schematic representation, in perspective, of an alternate form of the invention.
Figure 11:
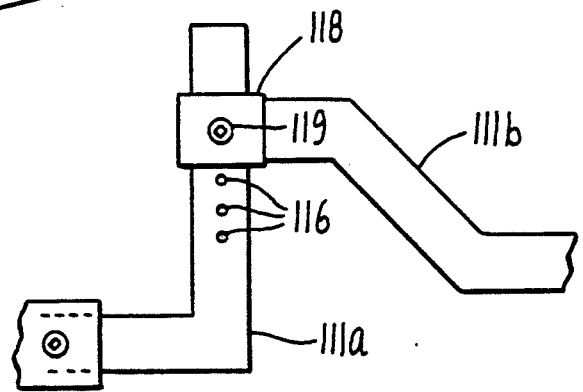
FIG. 11 is a side elevational view of the alternate form of the invention shown in FIG. 10.

As shown in FIGS. 10 and 11 an alternate form of the invention is provided in which a two piece support bar 111a and 111b is provided. First piece 111a includes a vertical bar 115 having a plurality of holes 116 formed therein for providing vertical adjustment of the front of the towing apparatus. Piece 111b has a vertically oriented sleeve 118 which slidably engages vertical bar 115 and has a connecting pin 119 which engages any of the holes 116 in vertical bar 115.

Figure 12:
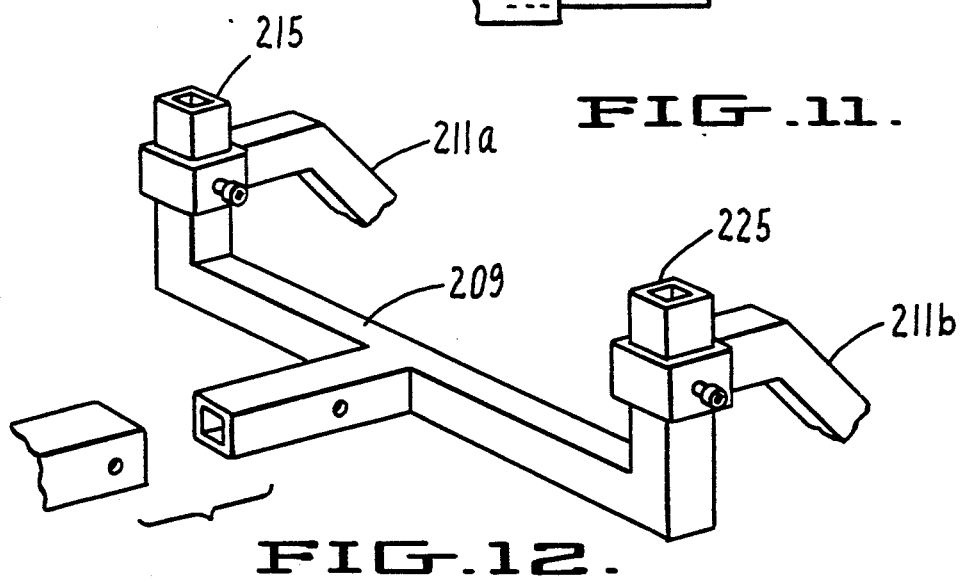
FIG. 12 is a perspective representation of yet another embodiment of the invention.

Referring to FIG. 12, yet another embodiment is shown for carrying two motorcycles. A yoke 209 is provided, having two vertical arms 215 and 225 to which support bars 211a and 211b are connected respectively to facilitate towing two motorcycles simultaneously.

What is claimed is:

1. A motorcycle towing apparatus for use with a towing vehicle comprising:
   a support bar adapted to slidably engage and rigidly connect to a hitch receiver carried by the towing vehicle, said support bar extending rearwardly from said hitch receiver in a direction parallel with the direction of forward motion of said towing vehicle,
   a ramp connected to the rear end of said support bar, said ramp movable between a first position in which said ramp is inclined downwardly from said support bar to the ground and a second position in which said ramp is elevated a sufficient height off the ground to provide clearance during towing, and wherein in both positions said ramp is parallel with said support bar,
   a wheel cradle carried by said support bar, said wheel cradle adapted to support only the front wheel of said motorcycle above the ground, and the rear wheel of said motorcycle rides on the ground, said wheel cradle holding said front wheel in a fully upright position where its axis of rotation is parallel with the axes of rotation of the wheels of said towing vehicle, said wheel cradle extending around at least one-fourth of the circumference of the front wheel of said motorcycle,
   releasable catch means carried by said support bar for securing said cradle to said support bar, and
   release means connected to said catch means whereby a single user may release said catch means and when unload a motorcycle from the towing apparatus.

2. The apparatus of claim 1 further comprising wheel clamp means carried by said cradle for securing said front wheel to said cradle.

3. The apparatus of claim 1 wherein said support bar comprises first and second pieces, said first piece including a vertical bar for providing vertical adjustment of the front of the towing apparatus.

* * * * *